(12) United States Patent
Bradenburg

(10) Patent No.: US 10,328,671 B2
(45) Date of Patent: Jun. 25, 2019

(54) SOLID-PHASE COMPOSITE STRUCTURE AND RELATED METHODS

(71) Applicant: Seaman Corporation, Wooster, OH (US)

(72) Inventor: Frank Bradenburg, Wooster, OH (US)

(73) Assignee: Seaman Corporation, Wooster, OH (US)

( * ) Notice: Subject to any disclaimer, the term of this patent is extended or adjusted under 35 U.S.C. 154(b) by 333 days.

(21) Appl. No.: 14/982,529

(22) Filed: Dec. 29, 2015

(65) Prior Publication Data

US 2017/0129211 A1 May 11, 2017

Related U.S. Application Data

(60) Provisional application No. 62/252,705, filed on Nov. 9, 2015.

(51) Int. Cl.
*B32B 13/02* (2006.01)
*B32B 5/02* (2006.01)
(Continued)

(52) U.S. Cl.
CPC ............ *B32B 13/02* (2013.01); *B32B 5/022* (2013.01); *B32B 5/024* (2013.01); *B32B 7/12* (2013.01);
(Continued)

(58) Field of Classification Search
CPC ........ C04B 16/0633; B32B 2262/0253; B32B 2262/0276; B32B 2305/08; B32B 27/304;
(Continued)

(56) References Cited

U.S. PATENT DOCUMENTS 5,318,832 A * 6/1994 Fishel .................. B32B 5/26
442/392
5,580,630 A 12/1996 Byrd
(Continued)

OTHER PUBLICATIONS

Product web-page for Sure-Gripe®, a concrete liner manufactured by Agru; electronically published in 2014.
(Continued)

*Primary Examiner* — Camie S Thompson
(74) *Attorney, Agent, or Firm* — Black, McCuskey, Souers & Arbaugh, LPA

(57) ABSTRACT

A composite structure having a solid-phase concrete base-substrate component; a fibrous component that is a plurality of polypropylene fibers embedded into and thereby mechanically attached to the solid-phase concrete base-substrate component, wherein the fibers extend from within the concrete base-substrate component and out of the concrete base-substrate component through an exterior surface of the concrete base-substrate component; a polyvinylchloride-adhesive layer component having a first and second surface, wherein the polyvinylchloride-adhesive layer component first surface is in contact with and adhesively attached to the fibrous component, and wherein the polyvinylchloride-adhesive layer second surface is in contact with and adhesively attached to a first surface of a polyvinylchloride or polyvinylchloride-alloy interior sheet; and a polyester reinforcing component having a first and second surface, wherein the polyester reinforcing component first surface is in contact with a second surface of the polyvinylchloride or polyvinylchloride-alloy interior sheet, and wherein the polyester reinforcing component second surface is in contact with a first surface of a polyvinylchloride or polyvinylchloride-alloy exterior sheet.

16 Claims, 2 Drawing Sheets

(51) Int. Cl.
  *B32B 13/14* (2006.01)
  *B32B 27/36* (2006.01)
  *B32B 27/30* (2006.01)
  *B32B 27/08* (2006.01)
  *B32B 27/32* (2006.01)
  *B32B 7/12* (2006.01)
  *B32B 27/12* (2006.01)
  *C04B 16/06* (2006.01)

(52) U.S. Cl.
  CPC .............. *B32B 13/14* (2013.01); *B32B 27/08* (2013.01); *B32B 27/12* (2013.01); *B32B 27/304* (2013.01); *B32B 27/32* (2013.01); *B32B 27/36* (2013.01); *C04B 16/0633* (2013.01); *B32B 2250/04* (2013.01); *B32B 2250/05* (2013.01); *B32B 2260/021* (2013.01); *B32B 2260/044* (2013.01); *B32B 2262/0253* (2013.01); *B32B 2262/0261* (2013.01); *B32B 2262/0276* (2013.01); *B32B 2262/10* (2013.01); *B32B 2262/101* (2013.01); *B32B 2262/14* (2013.01); *B32B 2305/08* (2013.01); *B32B 2307/402* (2013.01); *B32B 2307/50* (2013.01); *B32B 2307/714* (2013.01); *B32B 2307/7265* (2013.01); *B32B 2307/734* (2013.01); *B32B 2315/06* (2013.01)

(58) Field of Classification Search
  CPC ......... B32B 27/32; B32B 27/36; B32B 5/022; B32B 5/024; B32B 7/12; B32B 2315/06; B32B 13/02; B32B 13/14; B32B 2250/04; B32B 27/08; B32B 27/12; B32B 13/04; B32B 5/05; B32B 5/08; B32B 2307/7265
  See application file for complete search history.

(56) References Cited

U.S. PATENT DOCUMENTS

| | | | |
|---|---|---|---|
| 5,584,950 | A | 12/1996 | Gaffigan |
| 6,630,231 | B2 | 10/2003 | Perez et al. |
| 7,686,903 | B2 | 3/2010 | Muncaster et al. |
| 8,413,406 | B2 | 4/2013 | Jablonka et al. |
| 8,715,819 | B2 | 5/2014 | Gencer et al. |
| 8,793,862 | B2 | 8/2014 | Weber et al. |
| 2009/0123687 | A1 | 5/2009 | Chakraborty et al. |
| 2012/0313307 | A1 | 12/2012 | Cartwright et al. |
| 2013/0247490 | A1 | 9/2013 | Strait |
| 2015/0052847 | A1 | 2/2015 | Wiercinski et al. |
| 2015/0231863 | A1 | 8/2015 | Knebel et al. |
| 2015/0352804 | A1* | 12/2015 | Kohlman ................ B32B 27/32 428/159 |

OTHER PUBLICATIONS

Product web-page for T-Lock, a PVC liner manufactured by Ameron International Protective Lining Products; electronically published in 2004.

\* cited by examiner

US 10,328,671 B2

SOLID-PHASE COMPOSITE STRUCTURE AND RELATED METHODS

CROSS-REFERENCE TO RELATED APPLICATIONS

This patent application claims priority to U.S. provisional patent application Ser. No. 62/252,705 filed on Nov. 9, 2015, and the subject matter of U.S. provisional patent application Ser. No. 62/252,705 is hereby incorporated by reference into this application.

BACKGROUND OF THE INVENTION

Waterproofing technologies for solid-phase concrete are known and include post treatment of a solid-phase concrete surface with at least a liquid-applied coating or paint. A need remains for additional concrete solid-phase substrate waterproofing technologies.

BRIEF SUMMARY OF THE INVENTION

A composite structure having a solid-phase concrete base-substrate component; a fibrous component that is a plurality of polypropylene fibers embedded into and thereby mechanically attached to the solid-phase concrete base-substrate component, wherein the fibers extend from within the concrete base-substrate component and out of the concrete base-substrate component through an exterior surface of the concrete base-substrate component; a polyvinylchloride-adhesive layer component having a first and second surface, wherein the polyvinylchloride-adhesive layer component first surface is in contact with and adhesively attached to the fibrous component, and wherein the polyvinylchloride-adhesive layer second surface is in contact with and adhesively attached to a first surface of a polyvinylchloride or polyvinylchloride-alloy interior sheet; and a polyester reinforcing component having a first and second surface, wherein the polyester reinforcing component first surface is in contact with a second surface of the polyvinylchloride or polyvinylchloride-alloy interior sheet, and wherein the polyester reinforcing component second surface is in contact with a first surface of a polyvinylchloride or polyvinylchloride-alloy exterior sheet.

A composite structure having a solid-phase base-substrate component; a fibrous component that is a plurality of fibers embedded into and thereby mechanically attached to the solid-phase base-substrate component, wherein the fibers extend from within the base-substrate component and out of the base-substrate component through an exterior surface of the base-substrate component; an adhesive layer component having a first and second surface, wherein the adhesive layer component first surface is in contact with and adhesively attached to the fibrous component, and wherein the adhesive layer second surface is in contact with and adhesively attached to a first surface of an interior sheet; and a reinforcing component having a first and second surface wherein the reinforcing component first surface is in contact with a second surface of the interior sheet, and wherein the reinforcing component second surface is in contact with a first surface of an exterior sheet.

A method comprising the step of applying liquid-phase concrete to a fibrous component of a composite structure, wherein the composite structure has a fibrous component that is a plurality of fibers an adhesive layer component having a first and second surface, wherein the adhesive layer component first surface is in contact with and adhesively attached to the fibrous component, and wherein the adhesive layer second surface is in contact with and adhesively attached to a first surface of an interior sheet; and a reinforcing component having a first and second surface wherein the reinforcing component first surface is in contact with a second surface of the interior sheet, and wherein the reinforcing component second surface is in contact with a first surface of an exterior sheet.

A composite structure having a solid-phase base-substrate component; a fibrous component that is a plurality of fibers embedded into and thereby mechanically attached to the solid-phase base-substrate component, wherein the fibers extend from within the base-substrate component and out of the base-substrate component through an exterior surface of the base-substrate component; a first adhesive layer component having a first and second surface, wherein the first adhesive layer component first surface is in contact with and adhesively attached to the fibrous component, and wherein the first adhesive layer second surface is in contact with and adhesively attached to a first surface of an interior sheet; and a reinforcing component having a first and second surface wherein the reinforcing component first surface is adhesively adhered to a second surface of the interior sheet, and wherein the reinforcing component second surface is adhesively adhered to a first surface of an exterior sheet.

BRIEF DESCRIPTION OF THE SEVERAL VIEWS OF THE DRAWING(S)

DETAILED DESCRIPTION OF THE INVENTION

Figure 1:
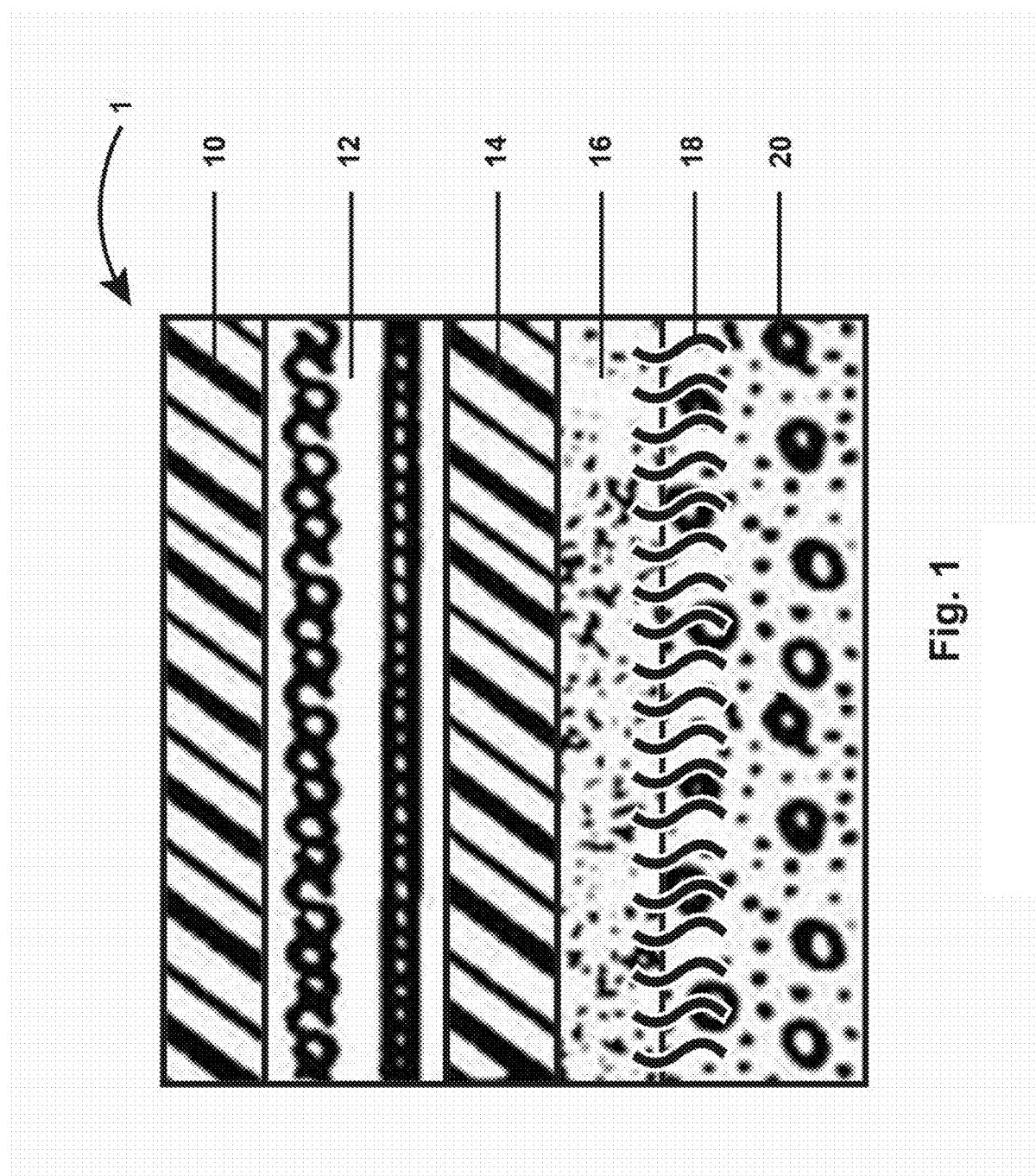
FIG. 1 is a schematic showing a solid-phase composite-structure embodiment.
Figure 2:
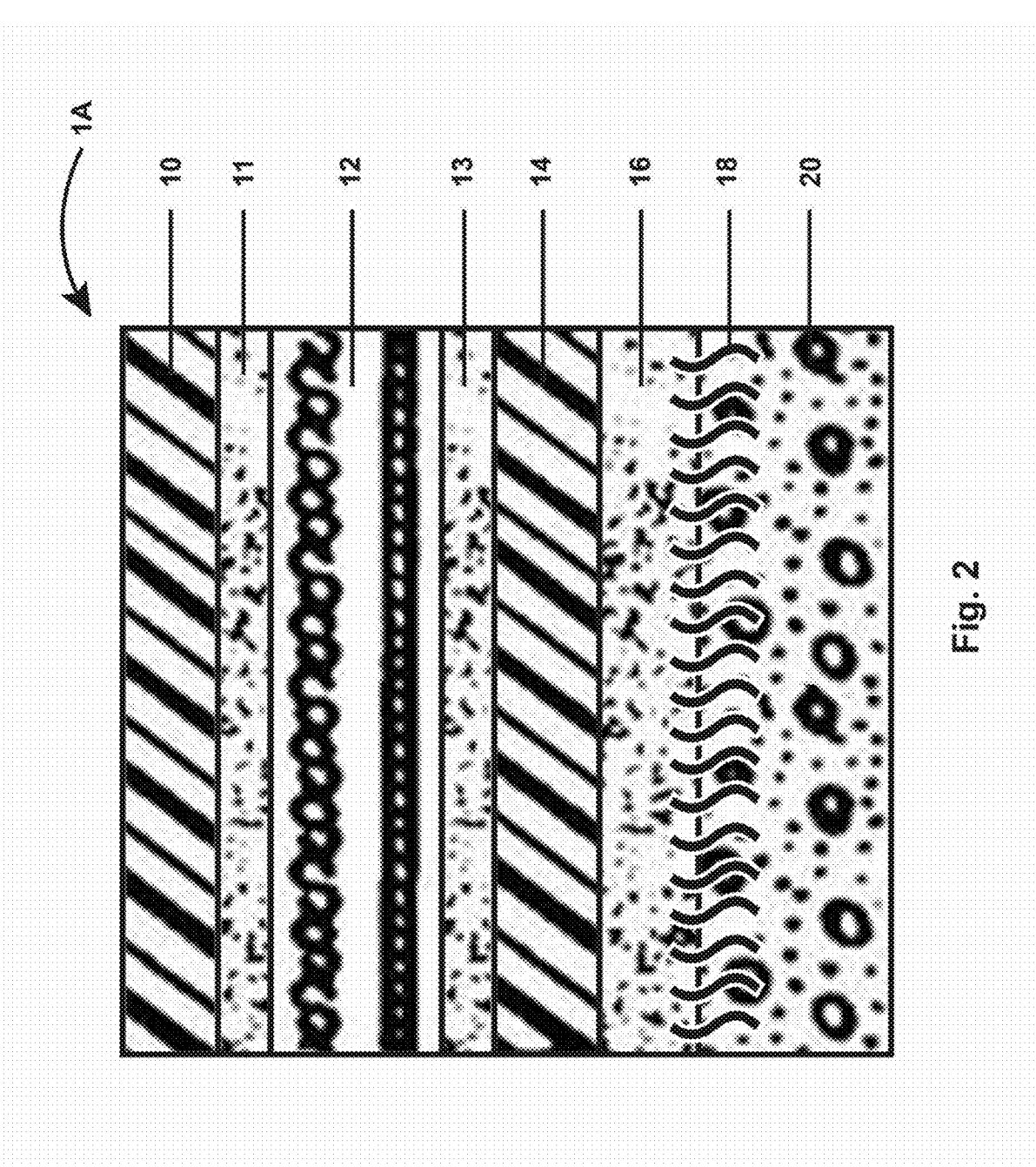
FIG. 2 is a schematic showing a solid-phase composite-structure embodiment.

With reference to FIGS. 1 and 2, generally provided are solid-phase composite-structure embodiments. FIG. 1 is a schematic that shows solid-phase composite structure 1 having solid-phase base-substrate component 20, fibrous component 18, adhesive-layer component 16, interior-sheet component 14, reinforcing component 12, and exterior-sheet component 10. FIG. 2 is a schematic that shows solid-phase composite structure 1A having solid-phase base-substrate component 20, fibrous component 18, adhesive-layer component 16, interior-sheet component 14, adhesive component 13, reinforcing component 12, adhesive component 11, and exterior-sheet component 10.

Embodiments are generally directed to pre-cast or cast-in-place solid-phase composite structure(s) 1 and 1A having components directly or indirectly mechanically attached to at least one side or surface of solid-phase base-substrate component 20 via fibrous component 18 that is at least partially embedded into the fixed matrix of solid-phase base-substrate component 20. "Pre-cast" and "cast-in-place" are terms that describe when and where a structure is manufactured. A "pre-cast" solid-phase composite structure 1 is prefabricated at a first manufacturing location and then eventually shipped to a second location for use. On the other hand, a "cast-in-place" concrete-based composite structure is a structure that is manufactured in the field and on location; in other words, it is not prefabricated. "Direct mechanical attachment" is a term that describes first and second components that are immediately adjacent to each other and also mechanically attached to one another. "Indirect mechanical attachment," is a term that describes first and second components that are separated by at least one in-between or intermediate component that serves to attach the first and second components to one another.

Other embodiments are directed to pre-cast or cast-in-place solid-phase composite structures having components directly or indirectly mechanically attached to at least two sides or surfaces of solid-phase base-substrate component 20 via at least one respective fibrous component 18 that is at least partially embedded therein. Other embodiments are directed to solid-phase composite structure 1 and 1A being pre-cast or cast-in-place concrete-based composite structures having non-concrete components directly or indirectly mechanically attached to at least one side or surface of concrete base-substrate component 20 via a fibrous component that is at least partially embedded into the concrete substrate. Additional solid-phase composite-structure 1 and 1A embodiments are directed to pre-cast or cast-in-place concrete-based composite structures having non-concrete components directly or indirectly mechanically attached to at least two sides or surfaces of concrete base-substrate component 20 via respective fibrous components that are at least partially embedded therein.

COMPONENTS

Solid-phase base-substrate component 20 is the substrate upon which all other components are directly or indirectly attached. As a non-limiting example, solid-phase base-substrate component 20 is a poured-concrete home foundation or any other solid-phase concrete structure that commonly needs waterproofing. Useful solid-phase base-substrate component 20 materials include solid-phase concrete, solid-phase concrete-containing materials, solid-phase cement-containing materials, solid-phase materials having a fixed matrix, and combinations thereof.

Fibrous component 18 is a plurality of non-woven fibers adhered to adhesive-layer component 16 and embedded into solid-phase base-substrate component 20. In an embodiment, each respective first end or portion of a plurality of fibers is adhered to adhesive-layer component 16 in a way that allows for a second end or portion of each respective fiber to extend away from adhesive-layer component 16 and into solid-phase base-substrate component 20. By being embedded in the fixed matrix of solid-phase base-substrate component 20, fibrous component 18 mechanically attaches (either directly or indirectly) solid-phase base-substrate component 20 to the other components of solid-phase composite structure 1. Useful fibrous-component materials include non-polymeric fibers, polymeric fibers, polypropylene fibers, nylon fibers, fiberglass fibers, basalt fibers, and combinations thereof.

Adhesive-layer component 16 adheres fibrous component 18 to interior-sheet component 14. Useful adhesive-layer-component materials include polyvinylchloride (PVC) adhesives, polyolefin adhesives, polyurethane adhesives, commercially known adhesives, and combinations thereof. Likewise, adhesive-layer components 11 and 13 are independently selected and useful adhesive materials include polyvinylchloride (PVC) adhesives, polyolefin adhesives, polyurethane adhesives, commercially known adhesives, and combinations thereof.

Interior-sheet component 14 is positioned between adhesive-layer component 16 and reinforcing component 12. In an embodiment, interior-sheet-component manufacturing materials provide waterproofing properties and salt-and-corrosion resistance to the overall composite structure 1. Useful interior-sheet-component materials include PVC, PVC alloys, polypropylene, polypropylene alloys, polyolefin, polyolefin alloys, and other known polymers and polymer alloys.

In embodiments, adhesive component 13 is positioned between and thereby adheres interior-sheet component 14 to reinforcing component 12.

In embodiments, reinforcing component 12 provides puncture resistance and dimensional stability for the membrane. Useful reinforcing-component manufacturing materials include broad woven fabrics, polyester fabric, and other known fabrics.

In embodiments, adhesive component 11 is positioned between and thereby adheres reinforcing component 12 exterior-sheet component 10.

Exterior-sheet component 10 is positioned adjacent to reinforcing component 12 and makes up the outermost polymeric surface of solid-phase composite structure 1. In an embodiment, exterior-sheet component manufacturing materials provide waterproofing-properties, salt-and-corrosion resistance, color, pattern, barnacle resistance, graffiti resistance, and combinations thereof to the overall composite structure 1. Useful exterior-sheet component 10 materials include PVC, PVC alloys, polyvinylfluoride (PVF), polyvinylidene fluoride (PVDF), and other known polymers.

Manufacturing

As mentioned above, embodiments are directed to pre-cast or cast-in-place solid-phase composite structures. In both pre-cast and cast-in-place solid-phase composite structures, solid-phase composite structure 1 or 1A is manufactured using a step in which a liquid-phase base-substrate component is applied to or contacted with fibrous component 18. By contacting a liquid-phase base-substrate component with fibrous component 18, the plurality of fibers that make up fibrous component 18 penetrate into the liquid phase and remain there during the phase change or curing of the liquid phase into a solid phase. At the time of phase change, i.e., from liquid to solid, the plurality of fibers become mechanically attached to the solid phase from under the surface of the solid phase where the fibers are embedded in and thereby mechanically attached to the solid-phase fixed matrix. In embodiments, the liquid-phase base-substrate material is poured onto the plurality of fibers of fibrous component 18; as a non-limiting example, this is done by pouring liquid-phase base-substrate material into a mold wherein the interior cavity of the mold is defined by the plurality of fibers that make up fibrous component 18. In other embodiments, the fibrous component is applied to or rolled onto the top surface of the liquid phase and allowed to rest upon the liquid-phase surface as the fibers of fibrous component 18 penetrate into and beneath the surface of the liquid-phase base-substrate top surface; and as in the above embodiment, the fibers of fibrous component 18 remain there during the phase change or curing of the liquid phase into a solid phase. At the time of phase change, i.e., from liquid to solid, the plurality of fibers become mechanically attached to the solid phase from under the surface of the solid phase where the fibers are embedded in and thereby mechanically attached to the solid-phase fixed matrix.

Known manufacturing methods can be used to manufacture solid-phase composite structure 1, and in embodiments, solid-phase composite structure 1 is manufactured in steps. As a non-limiting example for manufacturing solid-phase composite structure 1, the three-layer laminate portion, e.g., the PVC or PVC alloy 10/polyester woven fabric 12/PVC or PVC alloy 14 laminate portion, is manufactured in a first step(s), then adhesive-layer component 16 is applied to interior-sheet component 14 followed by fibrous component 18 being applied to adhesive-layer component 16, and finally, contacting fibrous component 18 of this intermediate membrane structure with a liquid-phase base-substrate component and allowing the liquid-phase base substrate component to change phases into a solid—thereby creating solid-phase composite structure 1.

Known manufacturing methods can be used to manufacture the portion of solid-phase composite structure 1 that is a three-component laminate, wherein the three-component laminate is reinforcing component 12 having polymeric films or sheets 10 and 14 on either side. As a non-limiting example, known manufacturing methods allow for extruding a polymeric film or sheet such as PVC or a PVC alloy on a first side of a polyester woven fabric followed by extruding a PVC or a PVC alloy film or sheet on the second side of the polyester woven fabric. In an additional non-limiting example, known methods allow for co-extruding PVC or a PVC alloy films or sheets on both sides of a polyester woven fabric, thereby creating a three-component laminate that is a PVC or PVC alloy 10/polyester woven fabric 12/PVC or PVC alloy 14. In embodiments the extruded PVC or PVC alloy films or sheets 10 and 14 are at least partially embedded into polyester woven fabric 12 thereby fixing the three laminate components into place.

In still another non-limiting example shown in FIG. 2, and in place of extruding or coextruding sheets 10 and 14 onto reinforcing component 12 as described above, sheets 10 and 14 can be adhered to reinforcing component 12 using adhesive components 11 and 13. Known manufacturing methods can be used to apply adhesive to substrates including reinforcing component 12, sheet 10, and sheet 14. Persons of ordinary skill in the art can determine useful adhesive amounts and thicknesses without having to exercise undue experimentation. Methods for applying an adhesive to a substrate are well known.

Known methods can be used to apply adhesive-layer component 16 to both interior-sheet component 14 and fibrous component 18. Persons of ordinary skill in the art can determine useful amounts and thicknesses without having to exercise undue experimentation. Methods for applying an adhesive to a substrate are well known.

Fibrous component 18 is made up of a plurality of nonwoven fibers adhered to adhesive-layer component 16. Known methods for applying non-woven fibers to an adhesive layer can be used, and persons of ordinary skill in the art will be able to discover useful methods without having to exercise undue experimentation. Upon adhering a plurality of fibers to adhesive-layer component 16 (that is adhered to the three component laminate, e.g., PVC or PVC alloy 10/polyester fabric 12/PVC or PVC alloy 14), an intermediate membrane structure is prepared to be contacted with or applied to a liquid-phase base substrate component.

The liquid-phase base-substrate component is applied to or contacted with fibrous component 18 (of the intermediate membrane structure) and allowed to cure or change into the solid phase as described above- thereby creating solid-phase composite structure 1.

In an embodiment, the three-component laminate, e.g., a three-component laminate membrane that is a PVC or PVC alloy 10/polyester fabric 12/PVC or PVC alloy 14, can be used to provide any, all, or combinations of the following properties to solid-phase composite structure 1: waterproofing, color, pattern and texture, corrosion resistance, salt resistance, anti-barnacle properties, and graffiti resistance.

In another embodiment, solid-phase concrete composite structures 1 and 1A have improved tensile properties relative to concrete structures without surface elements attached thereto.

What is claimed is:

1. A composite structure comprising:
   a solid-phase concrete base-substrate component;
   a fibrous component that is a plurality of polypropylene fibers embedded into and thereby mechanically attached to the solid-phase concrete base-substrate component, wherein the fibers extend from within the concrete base-substrate component and out of the concrete base-substrate component through an exterior surface of the concrete base-substrate component;
   a polyvinylchloride-adhesive layer component having a first and second surface, wherein the polyvinylchloride-adhesive layer component first surface is in contact with and adhesively attached to the fibrous component, and wherein the polyvinylchloride-adhesive layer second surface is in contact with and adhesively attached to a first surface of a polyvinylchloride or polyvinylchloride-alloy interior sheet; and
   a polyester reinforcing component having a first and second surface, wherein the polyester reinforcing component first surface is in contact with a second surface of the polyvinylchloride or polyvinylchloride-alloy interior sheet, and wherein the polyester reinforcing component second surface is in contact with a first surface of a polyvinylchloride or polyvinylchloride-alloy exterior sheet.

2. The composite structure of claim 1, wherein the polyester reinforcing component is at least partially embedded into the polyvinylchloride or polyvinylchloride-alloy interior sheet and the polyester reinforcing component is also at least partially embedded into the polyvinylchloride or polyvinylchloride-alloy exterior sheet.

3. The composite structure of claim 1, wherein the polyester reinforcing component is a fabric.

4. The composite structure of claim 1, wherein the fibrous component is a plurality of non-woven fibers.

5. A composite structure comprising:
   a solid-phase base-substrate component;
   a fibrous component that is a plurality of polypropylene fibers embedded into and thereby mechanically attached to the solid-phase base-substrate component, wherein the fibers extend from within the base-substrate component and out of the base-substrate component through an exterior surface of the base-substrate component;
   an adhesive layer component having a first and second surface, wherein the adhesive layer component first surface is in contact with and adhesively attached to the fibrous component, and wherein the adhesive layer second surface is in contact with and adhesively attached to a first surface of an interior sheet; and
   a polyester reinforcing component having a first and second surface wherein the reinforcing component first surface is in contact with a second surface of the interior sheet, and wherein the reinforcing component second surface is in contact with a first surface of an exterior sheet.

6. The composite structure of claim 5, wherein the fibers are polymeric.

7. The composite structure of claim 5, wherein the interior sheet and exterior sheet are manufactured from the same material.

8. The composite structure of claim 5, wherein the interior sheet and exterior sheet are manufactured from different materials.

9. The composite structure of claim 5, wherein the reinforcing component is a fabric.

10. The composite structure of claim 5, wherein the fibrous component is a plurality of non-woven fibers.

11. A composite structure comprising:
a solid-phase base-substrate component;
a fibrous component that is a plurality of polypropylene fibers embedded into and thereby mechanically attached to the solid-phase base-substrate component, wherein the fibers extend from within the base-substrate component and out of the base-substrate component through an exterior surface of the base-substrate component;
a first adhesive layer component having a first and second surface, wherein the first adhesive layer component first surface is in contact with and adhesively attached to the fibrous component, and wherein the first adhesive layer second surface is in contact with and adhesively attached to a first surface of an interior sheet; and
a polyester reinforcing component having a first and second surface wherein the reinforcing component first surface is adhesively adhered to a second surface of the interior sheet, and wherein the reinforcing component second surface is adhesively adhered to a first surface of an exterior sheet.

12. The composite structure of claim 11, wherein the fibers are polymeric.

13. The composite structure of claim 11, wherein the interior sheet and exterior sheet are manufactured from the same material.

14. The composite structure of claim 11, wherein the interior sheet and exterior sheet are manufactured from different materials.

15. The composite structure of claim 11, wherein the reinforcing component is a broad woven fabric.

16. The composite structure of claim 11, wherein the fibrous component is a plurality of non-woven fibers.

* * * * *